(12) United States Patent
Chen

(10) Patent No.: US 6,237,734 B1
(45) Date of Patent: May 29, 2001

(54) MULTI-PURPOSE TRAVELING LUGGAGE

(75) Inventor: Joseph Kuan-tan Chen, Quezon (PH)

(73) Assignee: Isabelita Hilario Chen, Quezon (PH)

( * ) Notice: Subject to any disclaimer, the term of this patent is extended or adjusted under 35 U.S.C. 154(b) by 0 days.

(21) Appl. No.: 09/540,751

(22) Filed: Mar. 31, 2000

(30) Foreign Application Priority Data

Apr. 14, 1999 (TW) .............................................. 088205734

(51) Int. Cl.$^7$ .............................. A45C 5/00; A45C 13/00
(52) U.S. Cl. .......................... 190/18 A; 190/115; 190/1; 190/15.1; 280/37; 16/113.1; 108/119
(58) Field of Search ........................ 16/113.1; 190/18 A, 190/115, 1, 11, 8, 15.1; 280/37, 30, 43.1; 108/119, 42

(56) References Cited

U.S. PATENT DOCUMENTS

| | | | |
|---|---|---|---|
| 2,957,736 | * 10/1960 | Olander et al. | 108/119 |
| 3,265,019 | * 8/1966 | Haydock | 108/119 |
| 5,374,073 | * 12/1994 | Hung-Hsin | 190/18 A |
| 5,507,508 | * 4/1996 | Liang | 280/37 |
| 5,529,322 | * 6/1996 | Barton | 280/30 |
| 5,769,194 | * 6/1998 | Chang | 190/18 A |
| 5,941,352 | * 8/1999 | Lee | 190/11 |
| 6,016,893 | 1/2000 | Chen et al. . | |
| 6,105,508 | * 8/2000 | Ryburg | 108/42 |

FOREIGN PATENT DOCUMENTS 380388    1/2000   (TW) .

* cited by examiner

Primary Examiner—Allan N. Shoap
Assistant Examiner—Tri M. Mai
(74) Attorney, Agent, or Firm—Fei-Fei Chao; Venable, Baetjer, Howard & Civiletti, LLP

(57) ABSTRACT

The present invention relates to a multi-purpose traveling luggage which comprises a case body with an associated cover at front and a backboard in the back. When the luggage is positioned in an erect position, the outer corners at the bottom of the associated cover has two caster wheels and the lower portion of the backboard is connected to a pair of leg supports. The lower portions of the leg supports comprise a pair of leg wheels, and the upper portions of the leg supports are connected to the outer edges at the mid-portion of the backboard. There is a pair of drive rod members having their lower portions connected to the lower outer edges of the backboard and their upper portions connected to each other by a connecting rod member. The drive rod members are connected to the leg supports through the engagement of elongated scissor grooves on the leg supports and scissor pins on the drive rod members. Thereby when the drive rod members are in the open position, they form a scissor-like support frame with the leg supports. The drive rod members telescopically receive a pair of extension rods which are united by a handle bar for handling the support frame on the casters and the leg wheels. The two distal ends of the connecting rod member are encased in two casing tubes which can rotate on the connecting rod member pivotally. In the first embodiment, there is provided for a connecting board which is attached to the casing tubes and which can be flipped on top of the case body and be used as a cart for carrying goods. In the second embodiment, there is provided for an article carrying board which at one end is pivotally connected to the top of the backboard and the front end comprises a U-shaped hook. Such a U-shaped hook and be flipped over and locked in onto the connecting rod member so as to form a sturdy structure for carrying goods.

8 Claims, 5 Drawing Sheets

MULTI-PURPOSE TRAVELING LUGGAGE

RELATED APPLICATION

The present invention claims the priority of Taiwanese Patent Application No. 088205734, filed on Apr. 14, 1999, and issued on Jan. 21, 2000, as Taiwanese Patent No. 380388, which is herein incorporated by reference.

1. Field of the Invention

The present invention relates to a traveling luggage, especially, a multi-purpose traveling luggage which helps a traveler alleviate troubles due to having multiple luggages. The present invention is an improvement of U.S. Pat. No. 6,016,893, issued on Jan. 25, 2000, which is herein incorporated by reference.

2. Background of the Invention

It is usually very inconvenient and burdensome for a traveler to carry numerous luggages. To minimize the inconvenience, various innovations have been developed and sold in the market. Examples of such innovations include using a foldable lightweight stroller to assist in transporting heavy luggages, designing luggages with an attached pulling bar and rolling wheels for easy movement, etc. However, these designs pose considerable burden to a traveler when the luggages are not in use, because they are only useful for pulling themselves and do not have the capability of lessening the burden of carrying other luggages.

To alleviate the aforementioned inconvenience and burden of a traveler, U.S. Pat. No. 6,016,893 provides a multi-purpose traveling luggage, which is not only simply structured and easily handled, but also versatile enough to be used as a sitting stool, a baby stroller, or a cart for carrying multiple pieces of baggage.

While the multi-purpose traveling luggage of U.S. Pat. No. 6,016,893 is generally satisfactory in achieving its intended goals, it has the following shortcomings:

1. When the multi-purpose luggage is used as a cart for carrying other luggage(s), instead of as a sitting stool or baby stroller, the drive rod members are not connected to the luggage body, thus, there is no place for putting other luggages onto the multi-purpose luggage-converted carrying cart;
2. For the aforementioned reasons, the drive rod members of the multi-purpose luggage tend to close on themselves, which make them more difficult to handle when the multi-purpose luggage functions as a cart;
3. In order to carry other luggage(s), the swing case of the multi-purpose luggage has to be elevated to form the support surface, which requires multiple steps of unlocking, opening the frame, elevating and rotating, and locking the frame; it is inconvenient for a traveler, especially when encountering uneven road conditions or stairs, to close the frame and carry the luggage(s) by hand.

SUMMARY OF THE INVENTION

It is then an objective of the present invention to provide a multi-purpose traveling luggage which is lightweight, sturdy, convenient, and can be used for carrying other luggage(s), thus, lessening the burden and exhaustion resulted from carrying several luggages for travelers.

Particularly, it is an objective of the present invention to provide a multi-purpose traveling luggage, which can be pulled or pushed, used for carrying other luggages, and maneuvered at any directions.

Further, it is another objective of the present invention to provide a multi-purpose traveling luggage which can instantly be converted from a normal luggage into a pulling luggage or a luggage that carries other luggage(s). This multi-purpose traveling luggage is fast and convenient for a traveler.

The present invention is directed to a multi-purpose traveling luggage which comprises a case body having a backboard at the back, an associated cover connected to the front portion of the case body. When the multi-purpose luggage is in the erect position, two caster wheels are seen at the outer corners of the bottom side of the associated cover. There is a pair of leg supports attached to the midportion of the backboard. Each of the lower ends of the leg supports is connected to a leg wheel. Each of the upper ends of the leg supports is fixedly connected to the outer edge of the backboard.

Additionally, there is a pair of drive rod members. The lower portions of the drive rod members are fixedly connected to the lower portions of the backboard at the outer edges. The upper portions of the drive rod members are connected to each other by a connecting rod member, which slidably engages in the leg supports to form a scissor-like support frame. The drive rod members telescopically receive a pair of extension rods, which are united by a handle bar to facilitate the pushing or pulling of the scissor-like support frame.

The two distal ends of the connecting rod member are encased in two casing tubes which can rotate around the connecting rod member. The two casing tubes are connected by a connecting board, which size is within the space limit between the two drive rod members. The connecting board can be flipped counterclockwise from its folding position at the connecting rod member to the top of the case body which then can securely connect the upper portion of the drive rod members to the top of the case body to form a support surface. The support surface formed by the connecting board on top of the case body can be used to carry other luggages.

In addition, there is a hook lock located in the middle of the upper portion of the back side of the backboard which can lock the drive rod members in a closed position or release the drive rod members from such a position. There are also two L-shaped hooks located at the two shoulders of the upper portion of the backboard. These L-shaped hooks are used to lock the handle bar of the extension rod members to prevent the supporting frame from being accidentally released.

DETAILED DESCRIPTION OF THE INVENTION AND BEST EMBODIMENTS

Figure 1:
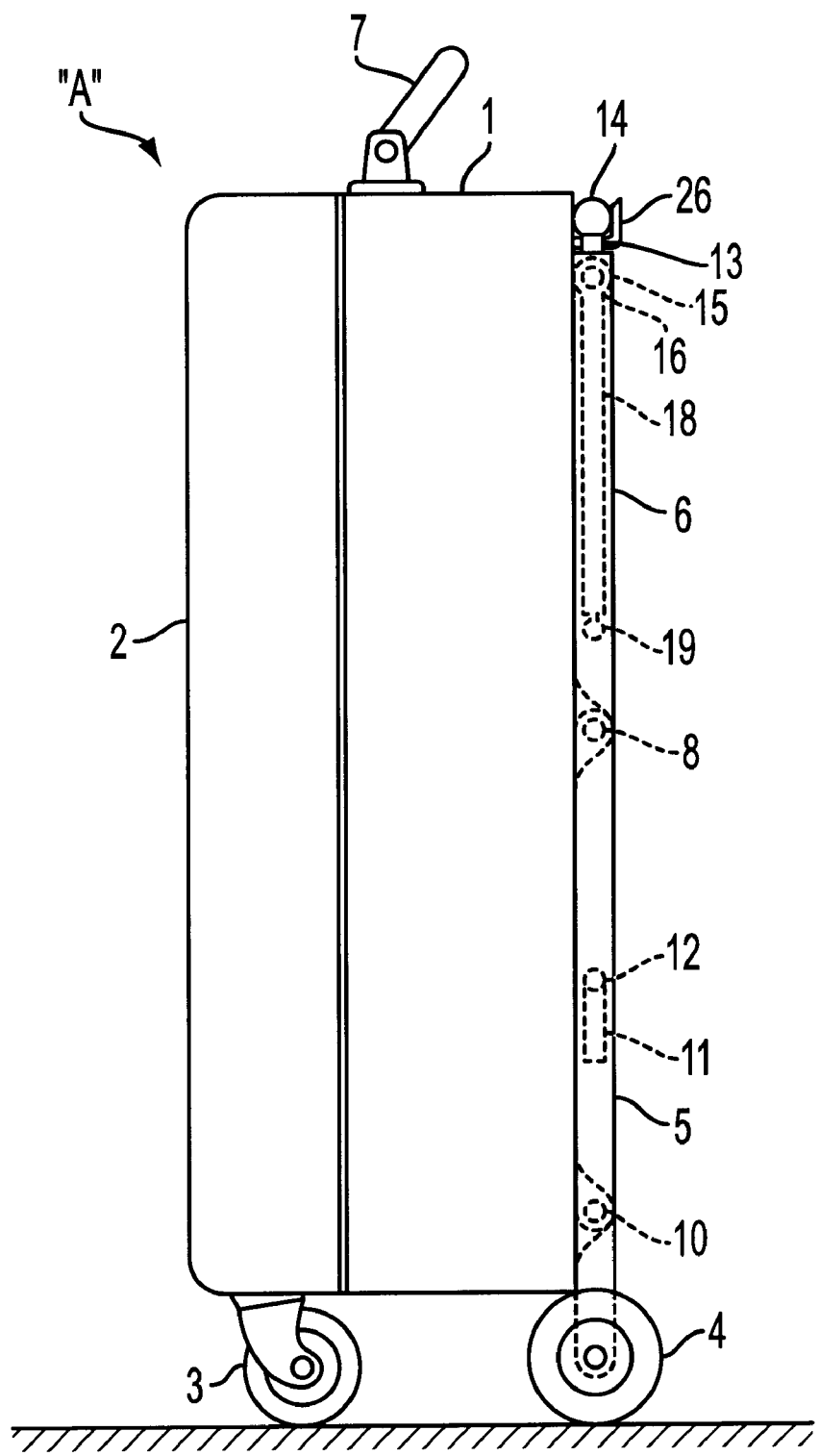
FIG. 1 is a side view of the multi-purpose traveling luggage of the present invention where the luggage is in an erect position suitable for hand-carrying.
Figure 4:
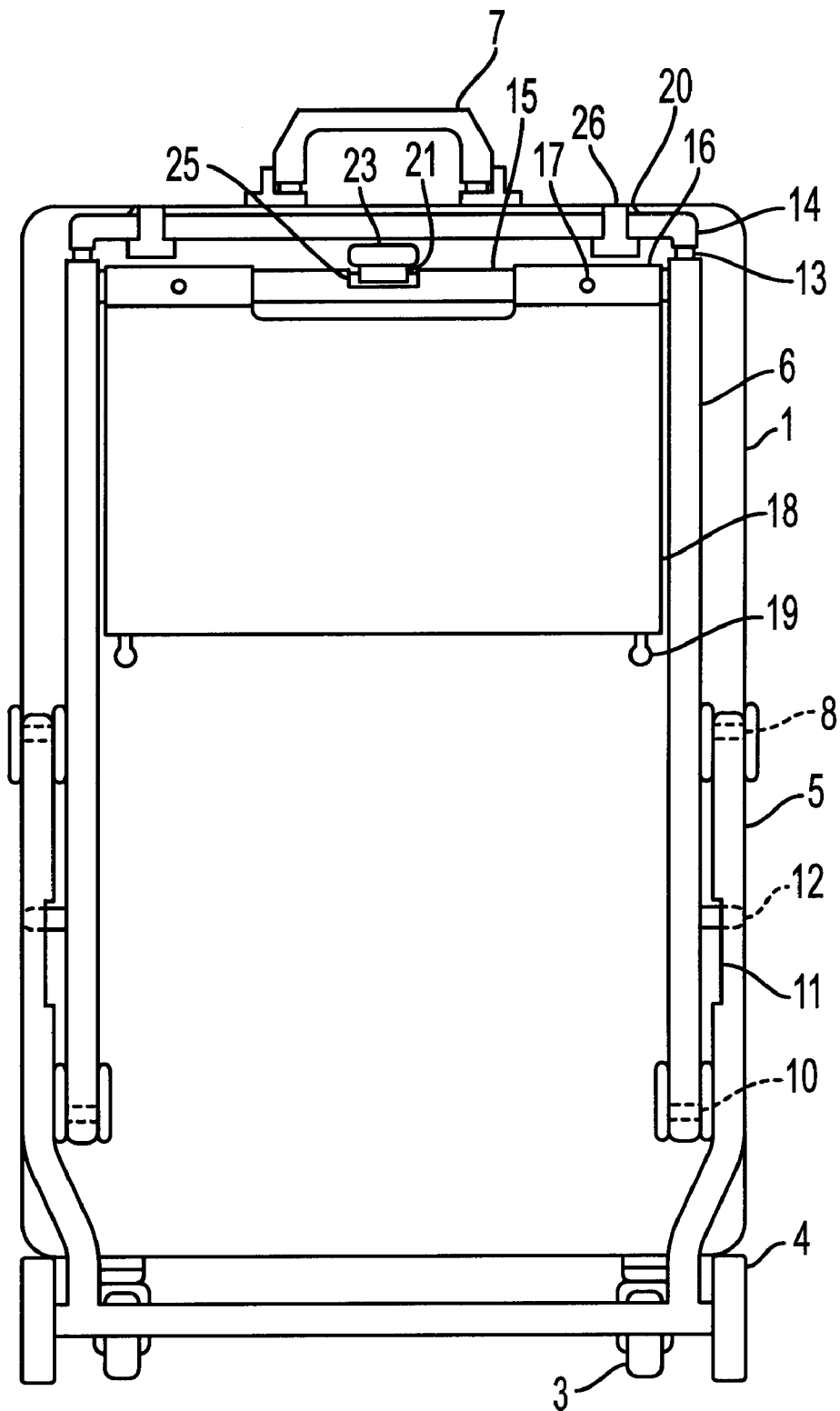
FIG. 4 is a back view of the multi-purpose traveling luggage of the present invention showing that the support frame has been in the closed position at the back of the case body and locked by the hook lock, and the handle bar has been locked by the L-shaped hooks.

Referring to FIGS. 1 and 4, a multi-purpose traveling luggage "A" comprises a case body 1 (which has an associated case cover 2 in front, and a backboard [number not shown] at the back side), a pair of caster wheels 3, a pair of leg wheels 4, a pair of leg supports 5, a pair of drive rod members 6, and a handle bar 7. When the luggage "A" is in an erect position, the two caster wheels 3 are located at the bottom outer corners of the case cover 2, and the two leg wheels 4 are attached to the lower portions of the two leg supports to form a four-point support for the luggage "A". At this position, the luggage can be lifted and carried by hand through the handle bar 7 on top of the case body 1.

As shown in FIGS. 1 and 4, the leg wheels 4 are rotatably attached to the lower ends of the leg supports 5. The upper ends of the leg supports 5 are fixedly connected to the outer edges of the midportion of the backboard of the case body 1 by a pair of pivot means 8 (such as hinges, bolts, or screws). There is a pair of drive rod members 6 whose lower ends are fixedly connected to the lower portion of the backboard by a pair of pivot means 10 (such as hinges, bolts, fasteners, or screws).

Figure 3:
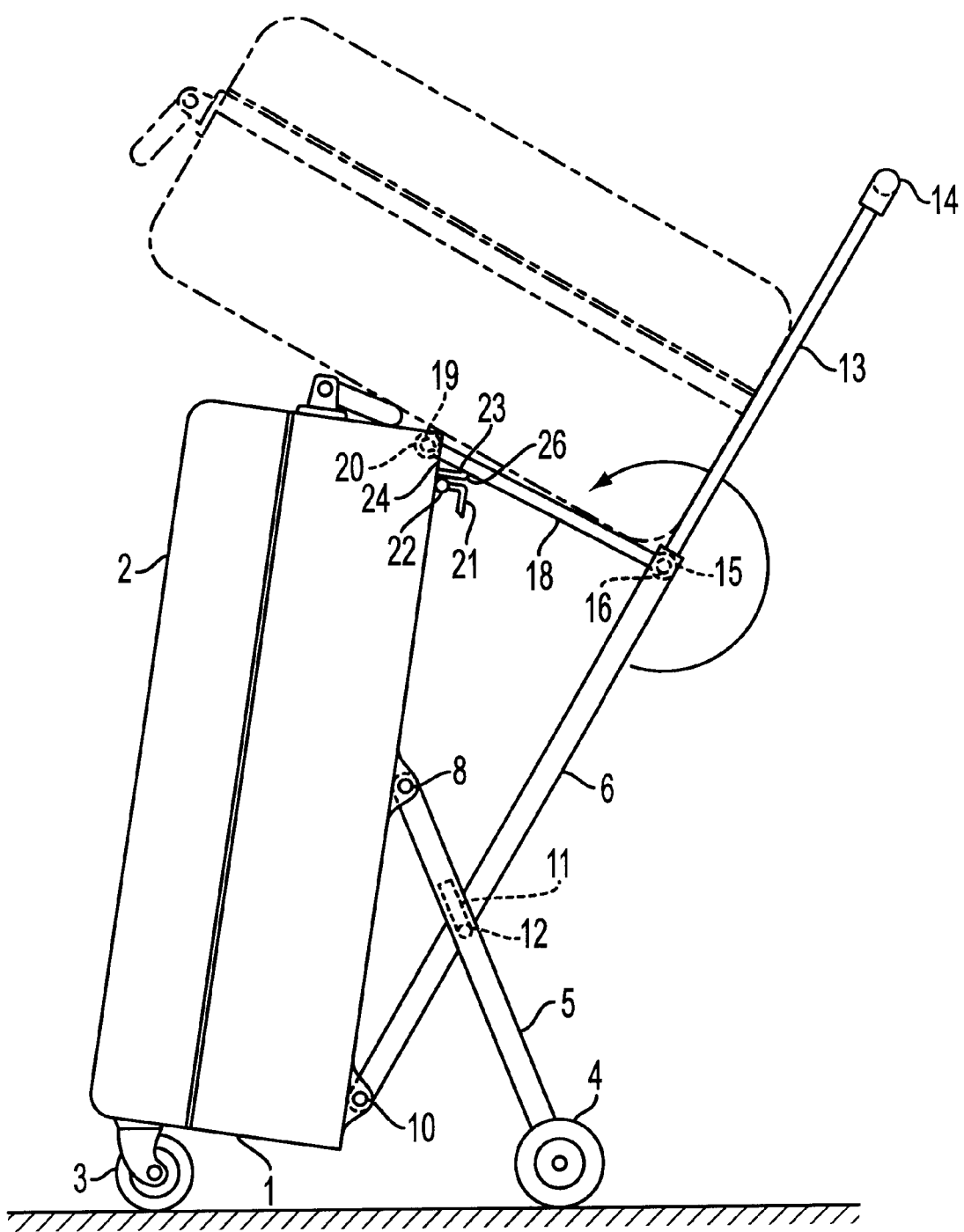
FIG. 3 is another side view of the multi-purpose traveling luggage of the present invention, where the scissor-like support frame has been opened, extension rods have been pulled out, and the connecting board has connected the support frame to the luggage to form a cart which can be pulled or pushed.

At near the middle portions of the leg members 5, there is a pair of elongated scissor grooves 11 for receiving, from the inner sides, a pair of scissor pins 12 from the midportion of the drive rod members. As shown in FIG. 3, when the drive rod members 6 are pulling outward or away from the backboard, the scissor pins 12 of the drive rod members 6 are slidably moved within and along the scissor grooves, while taking the leg supports 5 along with them, until the scissor grooves 11 and scissor pins 12 are engaged in a final "lock-in" position at the distal end of the scissor grooves 11. At this position, the leg supports 5 together with the leg wheels 4 and the opened drive rod members 6 form a scissor-like support frame for the backboard of the multi-purpose luggage "A".

When the opened drive rod members 6 are pushed back such as by hand to reattach to the backboard of the multi-purpose luggage "A", the scissor pins 12 slide back to the other end of the elongated slot scissor grooves 11, which result in returning the leg supports 5 and the leg wheels 4 to the original position which is close to the back side of the backboard of the case body 1, and the scissor-like support frame structure is returned to the closed position.

Figure 2:
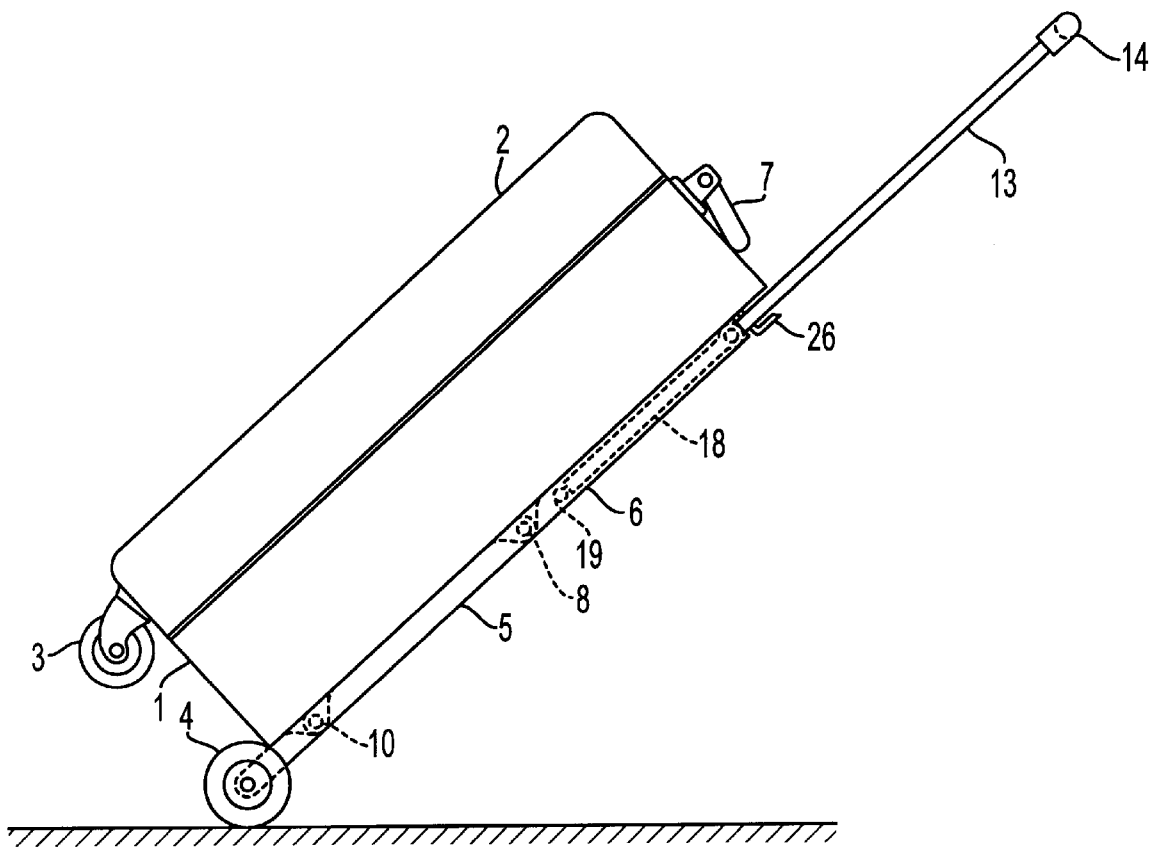
FIG. 2 is another side view of the multi-purpose traveling luggage of the present invention, where the extension rods have been pulled out to form a luggage suitable for pulling.

The drive rod members 6 are hollow, which telescopically receive a pair of extension rods 13. The upper ends of the extension rods 13 are united by a handle bar 14. As shown in FIG. 2, when the drive rod members 6 and the leg members 5 are in closed position, the extension rods 13 can be pulled out by using the handle bar 14. By doing so, the multi-purpose luggage "A" can be leaned at a great angle so that one can utilize the two leg wheels 4 for pushing or pulling the luggage.

As stated above, as shown in FIG. 3, when the drive rod members 6 are pulled outward from the backboard, the drive rod members 6 and the leg supports 5 are opened to form the scissor-like support frame. This allows the leg wheels 4 to move backwards and the multi-purpose luggage "A" to incline backwards at a slight angle, which in turn increases the distance between the caster wheels 3 and the leg wheels 4 and makes the entire frame structure of the multi-purpose luggage "A" much more sturdy. In this position, if the extension rods 13 are pulled out and locked onto the drive rod members 6 by a conventional stabilizing lock, the multi-purpose luggage "A" forms a cart with the caster wheels at the front and the leg wheels at the back, which can be pushed and turned freely in all directions.

As shown in FIG. 4, the upper portions of the drive rod members 6 are connected through a connecting rod member 15. The two distal ends of the connecting rod member 15 are encased in two casing tubes 16 which rotate pivotally around the connecting rod member 15. Each of the casing tubes 16 has a positioning hole 17 which matches the size of a positioning ball (not shown) located on the connecting rod member 15. The positioning ball is controlled by a conventional spring (not shown). When the positioning hole 17 rotates to the location of the positioning ball (not shown) on the connecting rod member 15, the positioning ball springs out which locks the casing tubes 16 into the connecting rod member 15.

Between the two drive rod members there is a connecting board 18. The top side of the connecting board 18 is attached to the lower sides of the two casing tubes, which in turn connects to the connecting rod member 15 by the matchup of the positioning hole 17 and positioning ball. The lower side of the connecting board 18 has a pair of hooks 19, which are located close to the left and right edges of the connecting board 18. The width of the connecting board 18 is within the space limit between the two drive rod members 15.

In the closed position (i.e., when the multi-purpose luggage is in an erect position), the drive rod members 6 are parallel to and in close contact with the backboard of the multi-purpose luggage "A". At this position, the connecting board 18 is parallel to the two drive rod members 6, and the flat surface of the connecting board 18 is parallel to and in close contact with the backboard of the multi-purpose luggage "A". This position allows the above-mentioned positioning hole 17 to match with the above-mentioned positioning ball (not shown) on the connecting rod member 15, which allows the connecting board 18 to be securely locked into the parallel position of the backboard of the multi-purpose luggage "A".

When the extension rods 13 are pulled out and the leg supports 5 and the drive rod members 6 are opened, the multi-purpose luggage "A" can be converted into a cart. At this moment, the connecting board 18 can be pulled away with force (such as by hand) from the lower edge of the connecting board and rotate counterclockwise, as shown by the direction of arrow in FIG. 3, until the two hooks 19 of the connecting board are hooked to the hook eyes 20, which are located at the top portion of the backboard. When the connecting board is pulled, the force applied allows the casing tubes 16 to rotate along the connecting rod member 15. The rotation of the casing tubes 16 causes the positioning hole 17 to leave its closed position and force the positioning ball out of the positioning hole 17.

The hook eyes 20 are constructed so that they can only receive the hooks 19 from the upper position. This construction allows the connecting board to be attached to and/or detached from the multi-purpose luggage "A" by upward-downward movement, but disallows the connected hook-hook eyes to move forward or backward.

After the connection of the hooks 19 and hook eyes 20, the drive rod members 6, together with the connecting board 18 and the case body, form a sturdy "cart" structure wherein the connecting board 18 is to be used as a platform for carrying additional luggages. The pulling or pushing of the multi-purpose luggage "A" does not affect the sturdiness of the "cart" structure. With this construction, the inconvenience and exhaustion caused by carrying multiple luggages during the travelling can be alleviated.

To close the "cart" structure, the connecting board 18 is elevated upward so as to remove the hooks 19 from the hook eyes 20. This is followed by rotating the connecting board 18 clockwise around the connecting rod member 15 (as shown in the opposite direction to the arrow in FIG. 3) and returning it to the position parallel to the drive rod members 6. At this position, the positioning holes 17 of the casing tubes 16 align with the positioning balls on the connecting rod member 15 which, with the assistance of the spring, enter the positioning holes 17. After the connection of the positioning holes with the positioning balls, the connecting board 18 is securely rested in the closed position, i.e., parallel to the drive rod members 6. Then, the extension rods 13 are pushed back to the drive rod members 6, followed by pushing the drive rod members 6 and the leg supports 5 to the position close to the back side of the backboard of the luggage "A".

Figure 5:
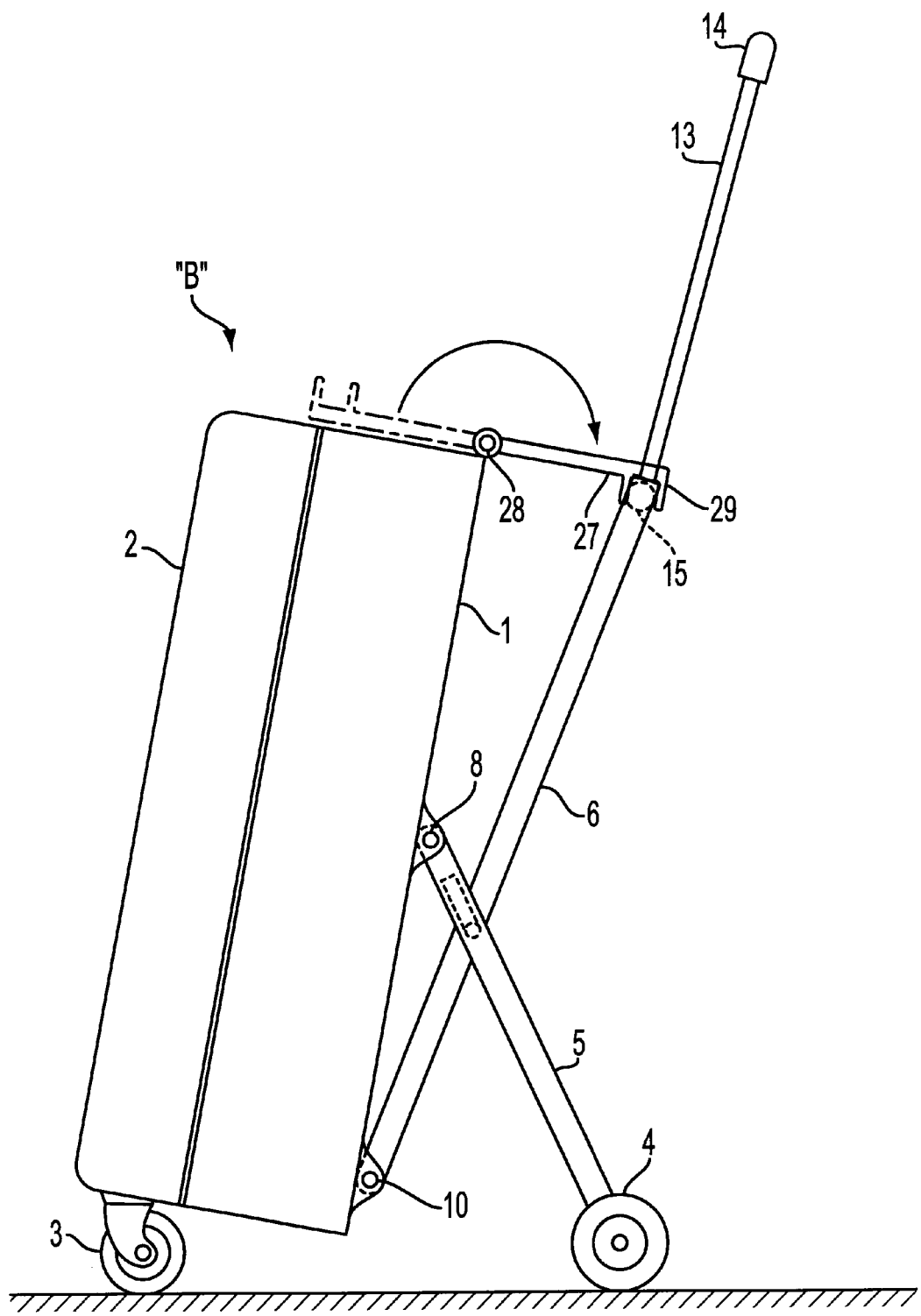
FIG. 5 is a side view of another embodiment of the multi-purpose traveling luggage of the present invention, where an article carrying board is provided on top of the case body. The article carrying board is connected to the connecting rod member by a U-shaped hook so that the drive rod members and the case body are securely connected to form a support surface for goods carrying.

Also, as shown in FIGS. 3 and 5, a hook lock 21 is located in the middle of the upper portion of the backboard. The hook lock 21 has a tilted surface. When the drive rod members 6 are in the closed position, the connecting rod member 15 is being pushed upward, which in turn touches the tilted surface of the hook lock 21 so as to push the hook lock 21 upward. The hook lock 21, with the assistance of the hook lock peg 22 and hook release board 23, acts to compress the hook lock spring 24, until the hook lock 21 is directly facing the hook lock hole 25, which is located on the connecting rod member 15. At this moment, the hook lock spring 24 is released to push the hook lock 21 into the hook lock hole 25 and thus securely connect the connecting rod member 15 to the case body 1. Because the steps of converting the multi-purpose luggage into a cart and returning it back to the closed position are simple and quick, the traveler can, depending upon actual situations such as facing uneven road or stairs, decide whether to use the multi-purpose luggage "A" as a cart or simply as a regular hand carried luggage.

As shown in FIG. 2, when the multi-purpose luggage "A" is used as a regular hand carried luggage, the extension rods 13 can be maintained at the extension state, which can be used to pull the multi-purpose luggage "A" by using the handle bar 14.

Alternatively, the extension rods 13 can be pushed back into the drive rod members 6 so as to return the multi-purpose luggage "A" to its original size and look. In that case, the multi-purpose luggage "A" is in no difference from other simple luggages of the same size and look, and can be stored, carried, or transported easily. While the extension rod members 13 are pressed back to the drive rod members, the two distal ends of the handle bar 14 fit into the L-shaped hooks 26 located on the outer edges of the top of the backboard 1. Under such condition, unless the handle bar 14 is pulled out together with the extension rod members 13 so as to detach from the L-shaped hooks 26, otherwise, the L-shaped hooks prevent the handle bar 14 from pulling away from the case body 1 so as to prevent the drive rod members 6 and the leg support members 5 from being accidentally opened.

To open the drive rod members 6 and the leg supports 5 from this closed position, first, the extension rod members 13 are pulled out to allow the handle bar 14 to be detached from the L-shaped hook 26. Then, the hook release board 23 is pressed downward to compress the hook lock spring 24, which is located at the back of the hook release board 23. This allows the hook lock 21 to be elevated and detached from the hook lock hole 25. And, the drive rod members 6 and the leg supports 5 can be opened and converted into the cart-styled luggage "A" for carrying baggage.

FIG. 5 shows another embodiment of the present invention, i.e., the multi-purpose luggage "B". In this embodiment, an article carrying board 27 is horizontally placed on top of the case body 1. One end of the article carrying board 27 is connected to the top edge of the case body I at the top end of the backboard by a hinge or a pivot 28. The other end of the article carrying board 27 has a U-shaped hook 29 with the open end of the "U" facing up. The article carrying board 27 can be flipped back and be connected to said connecting rod member 15 in a clockwise movement as shown by the arrow in FIG. 5, in which case the open end of the "U" becomes upside down. The upside down U-shaped hook 29 can be fitly hooked onto the connecting rod member 15, thereby forming a sturdy structure which can be used for carrying other luggages.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A multi-purpose traveling luggage comprising:

a case body having a front portion and a back portion;

an associated cover connecting to the front portion of the case body;

a backboard connecting to the back portion of the case body; said backboard having an upper portion, a midportion, and a lower portion;

at least one pair of caster wheels provided at lower outer corners of the associate cover;

a pair of leg supports having upper ends and lower ends; said upper ends of said leg supports being connected to the midportion of said backboard; each of said lower ends of said leg supports receiving a leg wheel; said leg supports having a pair of elongated scissor grooves;

a pair of drive rod members having upper ends and lower ends; said lower ends of said drive rod members being connected to said lower portion of the backboard; said upper ends of said drive rod members receiving a pair of extension rods; said drive rod members having a pair of scissor pins which are slidably engaged in the pair of elongated scissor grooves of said leg supports, whereby when said drive rod members are pulled outwards from the backboard, said pair of scissor pins slides to an end of said pair of elongated scissor grooves to form a scissor-like support frame;

a connecting rod member connecting said pair of drive rod members;

a pair of casing tubes attached to said connecting rod member; and a connecting board attached to said pair of casing tubes, whereby when said scissor-like support frame is formed, said connecting board is rotated counterclockwise until connecting to the upper portion of said backboard.

2. The multi-purpose traveling luggage according to claim 1, wherein said top portion of said backboard comprises a hook lock which matches with a hook lock hole located on the connecting rod member.

3. The multi-purpose traveling luggage according to claim 1, wherein said connecting board has a lower end; said lower end of said connecting board having at least a hook.

4. The multi-purpose traveling luggage according to claim 3, wherein said top portion of said backboard has at least a hook eye for receiving said hook of said connecting board.

5. The multi-purpose traveling luggage according to claim 1, wherein said extension rods are united by a handle bar.

6. The multi-purpose traveling luggage according to claim 5, wherein said top portion of said backboard further comprises a pair of L-shaped hooks for receiving said handle bar.

7. A multi-purpose traveling luggage comprising:

a case body having a front portion and a back portion;

an associated cover connecting to the front portion of the case body;

a backboard connecting to the back portion of the case body; said backboard having an upper portion, a midportion, and a lower portion;

at least one pair of caster wheels provided at lower outer corners of the associate cover;

a pair of leg supports having upper ends and lower ends; said upper ends of said leg supports being connected to the midportion of said backboard; each of said lower ends of said leg supports receiving a leg wheel; said leg supports having a pair of elongated scissor grooves;

a pair of drive rod members having upper ends and lower ends; said lower ends of said drive rod members being connected to said lower portion of the backboard; said upper ends of said drive rod members receiving a pair of extension rods; said drive rod members having a pair of scissor pins which are slidably engaged in the pair of elongated scissor grooves of said leg supports, whereby when said drive rod members are pulled outward from the backboard, said pair of scissor pins slides to an end of said pair of elongated scissor grooves to form a scissor-like support frame;

a connecting rod member connecting said pair of drive rod members; and an article carrying board which is horizontally placed on top of the case body; said article carrying board having a front end and a back end; said back end of said article carrying board being pivotally connected to a top end of the backboard on the case body; wherein said article carrying board can be flipped back and connected to said connecting rod member.

8. The multi-purpose traveling luggage according to claim 7, wherein said front end of said article carrying board comprises a U-shaped hook which can be hooked onto said connecting rod member.

* * * * *